Patented Dec. 20, 1949

2,492,124

UNITED STATES PATENT OFFICE 2,492,124

FILM CASTING COMPOSITIONS AND METHOD OF MAKING SAME

Arthur E. Young and Elmer K. Stilbert, Midland, Mich., assignors to The Dow Chemical Company, Midland, Mich., a corporation of Delaware No Drawing. Application June 27, 1946, Serial No. 679,878

12 Claims. (Cl. 260—23.7)

This invention concerns certain aqueous colloidal solutions, or so-called "synthetic latices," comprising copolymers of vinyl aromatic compounds and conjugated aliphatic diolefines in dispersed form, which solutions have the property, when spread on a solid surface, of drying to form continuous solid films which are substantially non-tacky at room temperature. It pertains especially to such aqueous colloidal solutions comprising a copolymer of styrene and butadiene-1,3. The aqueous compositions provided by the invention form films which adhere tightly to most solid surfaces, e. g. of wood, paper, cloth, masonry, or metals, etc., on which they are cast and which usually are of sufficient hardness to resist marring and of sufficient flexibility and elasticity to prevent cracking, peeling, or spalling from the surfaces to which they are applied. They are useful as coating compositions which may be modified with usual addition agents to form paints.

Aqueous colloidal solutions of copolymers of vinyl aromatic compounds and aliphatic conjugated diolefines and ways of forming such solutions are known. In general, the solutions as heretofore prepared, e. g. in the manufacture of synthetic rubber, comprise water, the dispersed copolymer, an emulsifying agent, and usually an anti-oxidant to stabilize the copolymer against air during storage or use. A variety of emulsifying agents and anti-oxidants for use in such solutions are also known. Examples of such emulsifying agents are sodium oleate, sodium stearate, Aquarex D (a sodium sulphate ester of higher alcohols), and sodium sulphonates of alkylated naphthalenes, biphenyls, etc. Examples of anti-oxidants which may be employed are aromatic secondary amines, polyhydric phenols, and aldehyde-amine condensation products, etc.

In our researches, we have observed that aqueous colloidal solutions of copolymers of vinyl aromatic compounds and aliphatic conjugated diolefines, such as the previously known solutions just discussed, when applied as a thin film to a solid surface and permitted to dry, either fail to produce a residual continuous film of the copolymer, or form a copolymer film having properties poorly suited for protective coating purposes. Such solutions of the copolymers having less than 40 mole per cent of diolefine in the copolymer molecule, based on the combined amount of polymerizable materials of which the copolymer is composed, fail to form a continuous copolymer film when dried on a solid surface, or form a film which cracks, spalls or peels readily from the surface. Solution of such copolymers containing more than 56 mole per cent of diolefine chemically combined in the polymer molecule frequently form continuous copolymer films when spread on a solid surface and dried, but the copolymer films thus produced are soft, tacky, easily marred, and do not adhere well to the surfaces on which they are formed. In copending applications of E. L. Fiedler, Serial No. 679,879, filed June 27, 1946, and L. L. Ryden, Serial No. 679,877, filed June 27, 1946, it is disclosed that continuous tack-free films of resinous or rubber-like material may be cast directly from aqueous colloidal solutions of certain of the copolymers, containing between 40 and 56 mole per cent of a chemically combined diolefine. However, even in these instances the film-forming properties of the solutions, or the quality of the films produced, may be improved by modifying the solutions in accordance with the present invention. In general, the tendency toward formation of continuous films on drying such aqueous copolymer dispersions becomes greater with increase in the proportion of diolefine chemically combined in the copolymers. Although the copolymer films formed from solutions of the copolymers containing more than 56 mole per cent of chemically combined diolefine are unsatisfactory for the reasons just mentioned, they possess certain desirable properties, i. e. they are quite flexible and elastic and the tackiness thereof indicates a tendency toward formation of a bond with solids contacted therewith, even though the bond is not as strong as desired.

On a basis of these observations, we formed an opinion that the tackiness and other undesirable properties of the cast films of copolymers rich in a diolefine were due largely to a fairly high degree of residual unsaturation in the copolymer molecules and that it might be possible to discover agents which would further saturate the polymers without impairing their useful properties. It was thought that the objectionable characteristics of the films might thereby be overcome and the desirable properties be retained. Although this theory is believed to have been sound, it has not fully been substantiated and the inventions is not restricted thereto. However, the purposes then in mind have been accomplished to a degree greater than was contemplated.

Among the agents tested which might react with the copolymers to further saturate the latter were drying oils and unsaturated derivatives thereof. It was found that, by dispersing a drying oil material in an aqueous colloidal solution of such copolymers containing from 25 to 66 mole per cent of diolefine chemically combined in the polymer molecules, compositions were obtained which could be applied to solid surfaces, e. g. of paper, cloth, wood, or metal, etc., and dried to leave a tightly adhering uniform continuous film of the copolymer. Since such addition of a drying oil permitted casting of continuous films from aqueous colloidal solutions which, except for the addition, would not form continuous films and since it also resulted in formation of non-tacky films from aqueous polymer solutions which would otherwise form tacky films, it is evident that the drying oil performs a plurality of functions. Among the useful functions which it appears to perform are those of reacting with the copolymer to further saturate the latter, of plasticizing the copolymer, and of increasing the film forming characteristics over those possessed by the dispersed copolymer itself.

Drying oils have proven effective in producing film casting compositions when added to aqueous colloidal solutions of copolymers of monovinyl aromatic compounds and aliphatic conjugated diolefines containing from 25 to 66 mole per cent of diolefine chemically combined in the copolymer and they are also effective in instances in which a considerable part, e. g. as much as two-thirds on a mole ratio basis, of the vinyl aromatic compound employed in the copolymer-forming reaction is replaced by other polymerizable unsaturated organic compounds such as methyl methacrylate, vinyl chloride, or vinylidene chloride, etc. In most instances, drying oils are not satisfactorily effective in forming film casting compositions when added to aqueous colloidal solutions of such copolymers containing a chemically combined diolefine in proportions outside the limits just expressed. Drying oils are also not satisfactorily effective for the purposes of this invention when added to natural rubber latex. It appears that the degree of unsaturation of the polymer molecules in natural rubber latex and in aqueous colloidal solutions of the above-mentioned copolymers containing more than 66 mole per cent of a diolefine is too great to be satisfactorily overcome by addition of a drying oil, i. e. even though a drying oil be added to these solutions prior to spreading and drying the same, tacky films of poor quality are usually obtained. It also appears that the plasticizing action and film-forming characteristics of a drying oil are insufficient to overcome the hard, brittle characteristics of the aforementioned copolymers containing less than 25 mole per cent of a chemically combined diolefine, so that even though a drying oil be added to an aqueous dispersion of such copolymer, the resultant composition does not dry to form a tightly adhering continuous film of good quality.

The minimum proportion of drying oil to be added to an aqueous colloidal solution of the aforementioned copolymers varies somewhat with changes in the kind of drying oil employed and the proportion of chemically combined diolefine in the copolymer, but is in all instances sufficient to produce a continuous film upon spreading and drying the resultant composition. In most instances, a drying oil is added in amount corresponding to between 25 and 100 per cent of the weight of the diolefine-containing resin which is to be modified therewith.

When using a given proportion of a drying oil, the properties of the final film vary with change in the proportion of diolefine chemically combined in the dispersed copolymer with which the drying oil is admixed. In general, the films become somewhat softer, more flexible and more elastic with increase in the proportion of diolefine in said copolymer from 25 to 66 mole per cent of all polymerizable organic compounds of which the copolymer is composed.

Within the limits just given, the kind and proportion of drying oil, and the diolefine content of the copolymer treated with the oil, are varied in accordance with the properties desired in the final films. For instance, when an aqueous emulsion of the copolymer is to be applied to form a protective or decorative coating on wood or masonry, a fairly hard film resistant to marring is usually desired, but it is not of importance that the protective film be highly flexible and elastic. In such instance the proportion of drying oil is restricted so as not to exceed greatly that necessary for formation of a continuous film and the dispersed copolymer treated with the oil may advantageously contain only a limited amount of diolefine, e. g. an amount corresponding to from 25 to 55 mole per cent of all polymerizable organic compounds chemically combined in the copolymer. On the other hand, when a material such as paper or cloth is to be treated with the colloidal solution, it may be of prime importance that the protective coating formed thereon be highly flexible and quite elastic. A film having such properties may be obtained from an aqueous dispersion of a copolymer containing 40 mole per cent or more of chemically combined diolefine, which dispersion has been treated with a relatively large proportion of a drying oil, e. g. from 0.6 to 1.5 parts by weight of the oil per part of the copolymer with which it is admixed.

Examples of copolymers formed entirely or principally of a vinyl aromatic compound and an aliphatic conjugated diolefine and suitable for employment in practice of the invention are copolymers of styrene and butadiene-1,3; of styrene and isoprene; of 4-chlorostyrene and butadiene-1,3; of 4-chlorostyrene and isoprene; of 3-chlorostyrene and butadiene-1,3; of 2-chlorostyrene and butadiene-1,3; of butadiene-1,3 and a monoethyl-styrene containing the ethyl radical as a nuclear substituent; of styrene, butadiene-1,3 and vinyl chloride; of styrene, butadiene-1,3 and vinylidene chloride; or of styrene, butadiene-1,3 and methylmethacrylate, etc., provided the copolymers contain from 25 to 66 mole per cent of diolefine chemically combined with the other polymerizable organic compounds. Copolymers of styrene and butadiene and also of styrene, butadiene and vinylidene chloride are preferably used.

Any of the usual vegetable drying oils such as linseed oil, tung oil, oiticica oil, or dehydrated castor oil, etc., can be employed. Unsaturated copolymers of drying oils, which copolymers undergo oxidation on exposure to air, e. g. drying oil-modified alkyd resins or copolymers of drying oils with vinyl aromatic compounds such as styrene, may also be used. In many instances such copolymers are obtained in admixture with a drying oil. For convenience, the drying oils and unsaturated drying oil copolymers are hereinafter referred to as "drying oil materials."

Aqueous colloidal solutions of the copolymer which is to be modified with a drying oil material are usually prepared by forming an aqueous emulsion of the corresponding monomeric compounds, e. g. styrene and butadiene, and heating the emulsion in a closed container, usually at temperatures between 50° and 100° C. to effect polymerization.

... may, and usually does, contain a
... amount of a peroxide, or other polymeriza-
... catalyst, together with the water, an emul-
... agent and the compounds to be polymer-
... After completing the polymerization, the
... is cooled, the reactor opened, and a minor
... of an anti-oxidant, e. g. hydroquinone
... ethyl ether, phenyl-beta-naphthylamine,
... polymer of trimethyl-dihydroquinoline, etc.,
... added. The anti-oxidant is usually employed
... corresponding to between 0.5 and 5 per
... of the weight of the dispersed copolymer
... but it may be used in smaller or greater
... or, if desired, may be omitted.
... drying oil material, preferably linseed oil, is
... dispersed throughout the colloidal copolymer solu-
... in amount such that upon applying a por-
... of the resultant mixture to a solid surface
... permitting it to dry, a solid, non-tacky con-
... film is formed on the treated surface.
... 0.4 to 1 part by weight of drying oil mate-
... is usually employed per part of the dispersed
... copolymer to be treated therewith, but the dry-
... oil material may be used in smaller or greater
... proportions.
... drying oil material containing an emulsify-
... agent may be added directly to the aqueous
... copolymer solution if the latter is sufficiently
... dilute and be dispersed therein by vigorous agita-
... It is most conveniently first admixed with
... water and an emulsifying agent to form an emul-
... thereof and the emulsion is admixed with
... the colloidal copolymer solution.
... resultant composition may be applied in
... usual ways, e. g. by brushing, dipping or spray-
... to solids such as paper, cloth, wood, plaster,
... or concrete and be dried to form a tightly adher-
... clear transparent resin film on the surfaces
... treated therewith. Prior to such application a
... usual varnish resin such as rosin may be dis-
... persed in the mixture for purpose of increasing
... gloss of films formed upon spreading and dry-
... ing the mixture.
... Usual paint pigments such as zinc oxide,
... titanium oxide, or white lead, etc., may also be
... dispersed in the aqueous colloidal solution of
... the copolymer and drying oil to form a paint
... comprising water as a liquid medium. Paints
... formed in this manner spread well and dry rapidly
... to form durable protective coatings of good ap-
... pearance. Other usual ingredients such as fillers,
... paint driers, etc., may also be dispersed in the
... colloidal solution.
... following examples describe certain ways
... in which the principle of the invention has been
... applied, but are not to be construed as limiting
... the invention.

Example 1

This example, which describes results obtained
... attempts to cast resinous films directly from
... colloidal solutions of copolymers of sty-
... and butadiene, or copolymers of styrene,
... butadiene and vinylidene chloride, is presented
... purpose of comparison with subsequent ex-
... wherein drying oils are added to such
... colloidal copolymer solutions prior to casting films
... the solutions. The colloidal solutions em-
... were prepared by admixing the poly-
... starting materials, e. g. styrene and
... butadiene, or styrene, butadiene and vinylidene
... chloride, with an aqueous solution of an emulsi-
... agent, agitating to effect emulsification, and
... heating the mixture in a closed vessel at tempera-
... between 60° and 100° C. to cause polymerisation. In most instances potassium persulphate
was also initially added in amount corresponding
to about 0.4 per cent of the combined weight of
the compounds to be polymerized. After com-
pleting the polymerization, the vessel was cooled,
opened, and the resultant aqueous colloidal solu-
tion of the copolymer was removed. The solu-
tions thus prepared contained about 40 per cent
by weight of copolymer in dispersed form. Each
solution was applied as a layer of approximately
0.02 inch thickness to a glass plate. The layers
were dried, first at room temperature until ap-
parently free of water and thereafter at 70° C. for
about 3 hours so as to assure substantially com-
plete removal of moisture. The residual deposits
of copolymeric material were examined. The
following table identifies each copolymer by nam-
ing and giving the relative proportions of the
polymerizable compounds employed in forming
it. The table also describes the polymer residues
obtained by spreading and drying the colloidal
copolymer solutions.

*Table I*

| Run No. | Copolymer of— | | | Dried Copolymer Residue |
|---|---|---|---|---|
| | Styrene, Mole Per cent | Butadiene, Mole Per Cent | Vinylidene Chloride, Mole Per Cent | |
| 1 | 54.9 | 45.1 | | Opaque powder. |
| 2 | 43.8 | 56.2 | | A tacky, but clear, soft, flexible, rubbery film. |
| 3 | 14.8 | 85.2 | | A tacky, but clear, soft, rubbery film. |
| 4 | 55.0 | 26.5 | 18.5 | Opaque powder. |
| 5 | 40 | 38.5 | 21.5 | A hard opaque film which flaked badly. |
| 6 | 29 | 55.7 | 15.3 | A tacky, but clear, flexible film. |
| 7 | 31.7 | 61.0 | 7.3 | Do. |
| 8 | 20.6 | 65.7 | 13.7 | A tacky, translucent rubbery film. |

Example 2

In each of a series of experiments, an aqueous
colloidal solution, containing about 40 per cent
by weight of a dispersed copolymer of styrene and
butadiene, or of styrene, butadiene and vinylidene
chloride, was prepared by procedure similar to
that described in Example 1. Aqueous emul-
sions of drying oils, or drying oil copolymers
which retain drying properties, were prepared by
adding a drying oil, or such copolymer, to an
equal weight of an aqueous solution containing 2
per cent by weight of water-soluble methyl cel-
lulose, 4 per cent of the 2-amino-2-methyl-pro-
panol salt of oleic acid as an emulsifying agent,
0.04 per cent of cobalt naphthenate and 0.5 per
cent of lead naphthenate. Such naphthenates
are well known paint driers. The mixtures were
agitated to effect emulsification. To an emulsion
of the drying oil, or drying oil copolymer, a col-
loidal solution of a butadiene-containing copol-
ymer was added in measured amount. In some
instances there was a tendency toward coagula-
tion of the butadiene-containing copolymer dur-
ing admixtures with the drying oil emulsion, in
which case soluble methyl cellulose was added to
the butadiene-containing copolymer solution in
amount corresponding to 2 per cent of the weight
of the copolymer prior to continuing addition of
the same to the drying oil emulsion. Stable col-
loidal dispersions of a butadiene-containing
copolymer and a drying oil, or drying oil copol-
ymer having drying properties, were thereby obtained. Each composition, thus prepared, was cast as a layer of about 0.02 inch thickness on a glass plate and permitted to dry, first at room temperature until apparently free of water and thereafter at 70° C. for about 3 hours. In each of this series of experiments, there remained on the glass plate a tightly adhering, non-tacky, continuous film of resinous material. The thickness of each dried film was measured. In certain of the experiments the resinous films were removed from the glass plates and tested, in accordance with methods given in ASTM D412-39T, to determine their tensile strength and per cent elongation values. Table II identifies each butadiene-containing copolymer employed in the experiments by naming and giving the mole per cent of the respective polymerizable organic compounds of which it was composed. It also names the drying oil or drying oil copolymer in the emulsion admixed with the colloidal solution of the butadiene-containing copolymer and gives the ratio by weight of the butadiene-containing copolymer to the drying oil or drying oil copolymer in the resultant composition. The table also describes each dried film prepared from such composition, its thickness, and, in the instances in which they were determined, gives the tensile strength in kilograms per square centimeter and the per cent elongation value of the dried film. The per cent elongation value is the per cent of its initial length by which a film may be elongated under tension before breaking.

Table II

| Run | Styrene, Mole Percent | Butadiene, Mole Percent | Vinylidene Chloride, Mole percent | Drying Oil or Copolymer Thereof | Wt. Ratio of Copolymer to Drying Oil | Film Thickness | Tensile Strength | Percent Elongation | Description of Dry Film |
|---|---|---|---|---|---|---|---|---|---|
| 1 | 43.8 | 56.2 | | Rezyl 869 (a drying oil modified alkyd resin). | 1/1 | 0.0124 | 52 | 125 | A slightly hazy, hard, flexible film. |
| 2 | 43.8 | 56.2 | | do | 4/1 | 0.0164 | 33 | 260 | A slightly hazy, soft, flexible film. |
| 3 | 43.8 | 56.2 | | An ester gum-dehydrated castor oil varnish. | 4/1 | 0.0225 | 22 | 233 | A slightly hazy, hard, flexible film. |
| 4 | 43.8 | 56.2 | | do | 1/1 | 0.0172 | 28 | 38 | A slightly hazy, soft, flexible film. |
| 5 | 43.8 | 56.2 | | China-wood Oil | 1/1 | | | | An opaque, soft, flexible film. |
| 6 | 43.8 | 56.2 | | do | 4/1 | | | | Do. |
| 7 | 29 | 55.7 | 15.3 | A copolymer of styrene and dehydrated castor oil. | 1/1 | 0.0141 | 50 | 78 | A clear, soft, flexible film. |
| 8 | 29 | 55.7 | 15.3 | do | 4/1 | 0.0138 | 48 | 28 | Do. |
| 9 | 14.2 | 55.1 | 30.7 | do | 1/1 | 0.0172 | 78 | 128 | Do. |
| 10 | 36.4 | 55.9 | 7.7 | do | 1/1 | 0.0190 | 75 | 113 | A hazy, soft, flexible film. |
| 11 | 36.4 | 55.9 | 7.7 | do | 4/1 | 0.0179 | 71 | 119 | A slightly hazy, soft, flexible film. |
| 12 | 31.7 | 61.0 | 7.3 | do | 1/1 | 0.0185 | 29 | 86 | A hazy, soft, flexible film. |
| 13 | 31.7 | 61.0 | 7.3 | do | 4/1 | 0.0194 | 38 | 147 | A slightly hazy, soft, flexible film. |
| 14 | 41.0 | 55.2 | 3.8 | do | 1/1 | 0.0149 | 78 | 6 | A hazy, soft, flexible film. |
| 15 | 41.0 | 55.2 | 3.8 | do | 4/1 | 0.0168 | 52 | 6 | A slightly hazy, soft, flexible film. |
| 16 | 20.6 | 65.7 | 13.7 | do | 1/1 | 0.0191 | 53 | 90 | Do. |
| 17 | 20.6 | 65.7 | 13.7 | do | 4/1 | 0.0184 | 63 | 85 | A clear, soft, flexible film. |
| 18 | 40.0 | 38.5 | 21.5 | do | 1/1 | 0.0158 | 83 | 97 | A hazy, soft, flexible film. |
| 19 | 40.0 | 38.5 | 21.5 | do | 4/1 | | | | A slightly hazy, soft, and fairly brittle film. |
| 20 | 36.4 | 55.9 | 7.7 | Linseed Oil | 4/1 | 0.0204 | 11 | 500 | A slightly hazy, soft, flexible film. |
| 21 | 40.0 | 38.5 | 21.5 | do | 4/1 | 0.0115 | 98 | 34 | A hazy, hard, flexible film. |
| 22 | 55.0 | 26.5 | 18.5 | do | 4/1 | | | | A hard, hazy, somewhat flexible film. |
| 23 | 29.0 | 55.7 | 15.3 | Rezyl 869 (a drying oil modified alkyd resin). | 1/1 | 0.0135 | 41 | 188 | A slightly hazy, soft, flexible film. |
| 24 | 29.0 | 55.7 | 15.3 | do | 4/1 | 0.0125 | 29 | 248 | Do. |
| 25 | 14.2 | 55.1 | 30.7 | do | 1/1 | 0.0150 | 48 | 168 | Do. |
| 26 | 36.4 | 55.9 | 7.7 | do | 1/1 | 0.0182 | 38 | 188 | A slightly hazy, fairly hard, flexible film. |
| 27 | 31.7 | 61.0 | 7.3 | do | 1/1 | 0.0139 | 46 | 166 | A slightly hazy, hard, flexible film. |
| 28 | 31.7 | 61.0 | 7.3 | do | 4/1 | 0.0148 | 27 | 360 | A slightly hazy, soft, flexible film. |
| 29 | 41.0 | 55.2 | 3.8 | do | 1/1 | 0.0146 | 53 | 238 | A slightly hazy, hard, flexible film. |
| 30 | 41.0 | 55.2 | 3.8 | do | 4/1 | 0.0189 | 49 | 115 | A slightly hazy, fairly soft, flexible film. |
| 31 | 20.6 | 65.7 | 13.7 | do | 1/1 | 0.0151 | 39 | 174 | A slightly hazy, fairly hard, flexible film. |
| 32 | 20.6 | 65.7 | 13.7 | do | 4/1 | 0.0142 | 28 | 212 | A clear, fairly soft, flexible film. |
| 33 | 40.0 | 38.5 | 21.5 | do | 1/1 | 0.0142 | 74 | 116 | A slightly hazy, hard, flexible film. |
| 34 | 14.2 | 55.1 | 30.7 | An ester gum-drated castor oil varnish. | 1/1 | 0.0145 | 30 | 47 | A slightly hazy, fairly hard, flexible film. |
| 35 | 31.7 | 61.0 | 7.3 | do | 1/1 | 0.0168 | 13 | 183 | A slightly hazy, soft, flexible film. |
| 36 | 31.7 | 61.0 | 7.3 | do | 4/1 | 0.0172 | 13 | 123 | Do. |
| 37 | 41.0 | 55.2 | 3.8 | do | 4/1 | 0.0230 | 30 | 226 | A hazy, soft, flexible film. |
| 38 | 20.6 | 65.7 | 13.7 | do | 4/1 | 0.0168 | 38 | 41 | A clear, soft, flexible film. |
| 39 | 40.0 | 38.5 | 21.5 | do | 1/1 | | | | A slightly hazy, hard, flexible film. |
| 40 | 40.0 | 38.5 | 21.5 | do | 4/1 | | | | A slightly hazy, hard, fairly flexible film. |
| 41 | 55.0 | 26.5 | 18.5 | do | 1/1 | | | | Do. |
| 42 | 36.4 | 55.9 | 7.7 | do | 4/1 | 0.0184 | 54 | 138 | A slightly hazy, fairly hard, flexible film. |
| 43 | 40.0 | 38.5 | 21.5 | do | 4/1 | 0.0153 | 118 | 31 | A hazy, hard, flexible film. |
| 44 | 31.7 | 61.0 | 7.3 | China-wood Oil | 4/1 | | | | An opaque, soft, flexible film. |
| 45 | 31.7 | 61.0 | 7.3 | do | 4/1 | | | | A slightly hazy, soft, flexible film. |
| 46 | 55.0 | 26.5 | 18.5 | do | 1/1 | | | | An opaque, fairly hard, flexible film. |
| 47 | 55.0 | 26.5 | 18.5 | do | 4/1 | | | | An opaque, hard, brittle film. |

*Example 3*

A water-emulsion paint was prepared by admixing 150 grams of Titone L (a mixture of titanium oxide and lithopone), 105 grams of titanium oxide, 45 grams of mica, 15 grams of sulphonated castor oil, 56 grams of an aqueous methyl cellulose solution of 10 per cent concentration, and 100 grams of an estergum-linseed oil varnish and grinding the mixture on a paint mill until it was in the form of a paste of uniform consistency. As a paint drier, a mixture of cobalt, manganese and lead naphthenates was added in amount corresponding to the presence in the resultant mixture of 0.02 per cent by weight of cobalt, 0.02 per cent of manganese and 0.5 per cent of lead. To the mixture there was added with stirring 715 grams of an aqueous solution containing in dispersed form 42 per cent by weight of a copolymer composed of 43.8 mole per cent styrene and 56.2 mole per cent butadiene. There was thereby obtained a white paint which may be thinned to suitable consistency with water and be applied by brushing or spraying to surfaces of wood, primed steel, or plaster, etc. After drying, there is obtained on the treated surface a tightly adhering paint film of high gloss. The film is satisfactorily resistant to abrasion both while dry and when wetted with water.

Other modes of applying the principle of the invention may be employed instead of those explained, change being made as regards the method or compositions herein disclosed, provided the steps or ingredients stated by any of the following claims or the equivalent of such stated steps or ingredients be employed.

We therefore particularly point out and distinctly claim as our invention:

1. A coating composition consisting essentially of an aqueous colloidal solution of one part by weight of a polymer comprising a monovinyl aromatic compound, of the class consisting of monovinyl aromatic hydrocarbons of the benzene series and nuclear monochlorinated monovinyl aromatic hydrocarbons of the benzene series, and an aliphatic conjugated diolefine, of the class consisting of butadiene and isoprene, in chemically combined form, the diolefine being in amount corresponding to between 25 and 66 mole per cent of all monomeric polymerizable organic compounds of which said polymer is composed, and not more than 1.5 parts by weight of a drying oil material selected from the class consisting of vegetable drying oils and unsaturated polymers derived from vegetable drying oils and having the property of undergoing drying by oxidation upon exposure to air, said drying oil material being present in a proportion sufficient to produce a continuous film upon spreading and drying the coating composition.

2. A coating composition, as described in claim 1, wherein the drying oil material is present in amount corresponding to between 25 and 100 per cent of the weight of the diolefine-containing polymer.

3. A coating composition, as described in claim 1, wherein the diolefine-containing polymer is a copolymer comprising styrene and butadiene in chemically combined form.

4. A coating composition, as described in claim 1, wherein the diolefine-containing polymer is a copolymer of styrene and butadiene and the drying oil material is present in amount corresponding to between 25 and 100 per cent of the weight of said copolymer.

5. A coating composition, as described in claim 1, wherein the diolefine-containing polymer is a copolymer of styrene, butadiene and vinylidene chloride.

6. A coating composition, as described in claim 1, wherein the diolefine-containing polymer is a copolymer of styrene, butadiene and vinylidene chloride and the drying oil material is present in amount corresponding to between 25 and 100 per cent of the weight of said copolymer.

7. A paint consisting essentially of an aqueous colloidal solution of one part by weight of a polymer comprising a monovinyl aromatic compound, of the class consisting of monovinyl aromatic hydrocarbons of the benzene series and nuclear monochlorinated monovinyl aromatic hydrocarbons of the benzene series, and an aliphatic conjugated diolefine, of the class consisting of butadiene and isoprene, in chemically combined form, the diolefine being in amount corresponding to between 25 and 66 mole per cent of all monomeric polymerizable organic compounds of which said polymer is composed, between 0.25 and 1.5 parts by weight of a vegetable drying oil, and a pigment.

8. A paint, as described in claim 7, wherein the vegetable drying oil is present in amount corresponding to between 25 and 100 per cent of the weight of the diolefine-containing polymer.

9. A paint, as described in claim 7, wherein the diolefine-containing polymer comprises styrene and butadiene.

10. A paint, as described in claim 7, wherein the diolefine-containing polymer is composed of styrene and butadiene and the vegetable drying oil is present in amount corresponding to between 25 and 100 per cent of said polymer.

11. A paint, as described in claim 7, wherein the diolefine-containing polymer is a copolymer of styrene, butadiene and vinylidene chloride and the vegetable drying oil is present in amount corresponding to between 25 and 100 per cent of said copolymer.

12. A method of making a coating composition which comprises admixing with an aqueous colloidal solution of a polymer comprising a monovinyl aromatic compound, of the class consisting of monovinyl aromatic hydrocarbons of the benzene series and nuclear monochlorinated monovinyl aromatic hydrocarbons of the benzene series, and from 25 to 66 mole per cent of an aliphatic conjugated diolefine, of the class consisting of butadiene and isoprene, in chemically combined form, a drying oil material selected from the class consisting of vegetable drying oils and unsaturated polymers derived from vegetable drying oils and having the property of undergoing drying by oxidation upon exposure to air, the drying oil material being in amount not exceeding 1.5 parts by weight thereof per part of the polymer derived from the vinyl aromatic compound and diolefine, and sufficient to produce a continuous film upon spreading and drying the coating composition.

ARTHUR E. YOUNG.
ELMER K. STILBERT.

REFERENCES CITED

The following references are of record in the file of this patent:

UNITED STATES PATENTS

| Number | Name | Date |
|---|---|---|
| 2,400,164 | Peaker | May 14, 1946 |